(12) United States Patent
Tang (10) Patent No.: US 11,244,418 B2
(45) Date of Patent: Feb. 8, 2022

(54) METHOD OF ENCODING WATERMARK INTO DIGITAL IMAGE BY PARTITIONING IMAGE INTO BLOCKS OF A SAME SIZE, APPARATUS FOR ENCODING WATERMARK INTO DIGITAL IMAGE, AND METHOD OF DETECTING WATERMARK IN DIGITAL IMAGE THEREOF

(71) Applicant: BOE Technology Group Co., Ltd., Beijing (CN)

(72) Inventor: Xiaojun Tang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 195 days.

(21) Appl. No.: 16/626,564

(22) PCT Filed: Mar. 15, 2019

(86) PCT No.: PCT/CN2019/078272
§ 371 (c)(1),
(2) Date: Dec. 25, 2019

(87) PCT Pub. No.: WO2020/186386
PCT Pub. Date: Sep. 24, 2020

(65) Prior Publication Data
US 2021/0334932 A1 Oct. 28, 2021

(51) Int. Cl.
*G06T 1/00* (2006.01)
(52) U.S. Cl.
CPC .......... *G06T 1/0071* (2013.01); *G06T 1/0028* (2013.01); *G06T 2201/0052* (2013.01); *G06T 2201/0061* (2013.01)
(58) Field of Classification Search
CPC ......... G06T 2207/20021; G06T 1/0085; G06T 2201/0051; G06T 2201/0065;
(Continued)

(56) References Cited

U.S. PATENT DOCUMENTS 6,785,401 B2 * 8/2004 Walker .................. G06T 1/0028
348/515
6,826,290 B1 * 11/2004 Murakami ............ G06T 1/0028
380/201

(Continued)

FOREIGN PATENT DOCUMENTS

CN 101719265 A 6/2010
CN 101799912 A 8/2010

(Continued)

OTHER PUBLICATIONS

International Search Report & Written Opinion dated Oct. 29, 2019, regarding PCT/CN2019/078272.

*Primary Examiner* — Yosef Kassa
(74) *Attorney, Agent, or Firm* — Intellectual Valley Law, P.C.

(57) ABSTRACT

A method of encoding a watermark into a digital image is provided. The method includes partitioning an image into a plurality of blocks of a same size; accumulating the plurality of blocks of the same size into a single block image; performing a Fourier transformation on the single block image to obtain a two-dimensional Fourier spectrum defined by Fourier coefficients at different positions of a Fourier domain; inserting a watermark into a frequency domain of the two-dimensional Fourier spectrum by modifying the two-dimensional Fourier spectrum as a function of watermarking coefficients in the watermark, to obtain a modified Fourier spectrum; performing an inverse Fourier transformation on the modified Fourier spectrum to obtain a watermarked image; copying the watermarked image horizontally and vertically into a plurality of copied watermarked images; and splicing the plurality of copied watermarked images into a reconstituted watermark image.

16 Claims, 5 Drawing Sheets

(58) Field of Classification Search
CPC ........ G06T 2201/0601; H04N 21/8358; H04N 2201/3233
See application file for complete search history.

(56) References Cited

U.S. PATENT DOCUMENTS

| | | | | |
|---|---|---|---|---|
| 6,993,148 | B1* | 1/2006 | Miyashita | G06T 1/0028 382/100 |
| 7,065,237 | B2* | 6/2006 | Murakami | G06T 1/0064 382/131 |
| 7,068,809 | B2* | 6/2006 | Stach | G06T 1/0028 380/54 |
| 7,152,161 | B2* | 12/2006 | Bruekers | G06T 1/0064 713/176 |
| 7,277,460 | B1* | 10/2007 | McCahon | G02F 1/3511 372/109 |
| 7,277,468 | B2* | 10/2007 | Tian | G06T 1/0042 348/E17.003 |
| 7,664,288 | B2* | 2/2010 | Pun | H04N 1/32149 382/100 |
| 7,860,270 | B2* | 12/2010 | Nakamura | H04N 1/32208 382/100 |
| 8,325,969 | B2* | 12/2012 | Simske | G06K 9/00 382/100 |

FOREIGN PATENT DOCUMENTS

| | | |
|---|---|---|
| CN | 102523440 A | 6/2012 |
| CN | 103856829 A | 6/2014 |
| CN | 106570813 A | 4/2017 |
| CN | 107846530 A | 3/2018 |
| WO | 2016153911 A1 | 9/2016 |

* cited by examiner

FIG. 1 partitioning an image into a plurality of blocks of a same size accumulating the plurality of blocks of the same size into a single block image performing a Fourier transformation on the single block image to obtain a two-dimensional Fourier spectrum defined by Fourier coefficients at different positions of a Fourier domain inserting a watermark into a frequency domain of the two-dimensional Fourier spectrum by modifying the two-dimensional Fourier spectrum as a function of watermarking coefficients in the watermark, to obtain a modified Fourier spectrum performing an inverse Fourier transformation on the modified Fourier spectrum to obtain a watermarked image copying the watermarked image horizontally and vertically into a plurality of copied watermarked images splicing the plurality of copied watermarked images into a reconstituted watermark image having a same size as the image, a respective subpixel of the reconstituted watermark image corresponding to a respective subpixel of the image

```
┌─────────────────────────────────────────────────────────────┐
│   partitioning an image into a plurality of blocks of a same size │
└─────────────────────────────────────────────────────────────┘
                              ⇩
┌─────────────────────────────────────────────────────────────┐
│  accumulating the plurality of blocks of the same size into a single │
│                          block image                        │
└─────────────────────────────────────────────────────────────┘
                              ⇩
┌─────────────────────────────────────────────────────────────┐
│  performing a Fourier transformation on the single block image to │
│   obtain a two-dimensional Fourier spectrum defined by Fourier │
│      coefficients at different positions of a Fourier domain │
└─────────────────────────────────────────────────────────────┘
                              ⇩
┌─────────────────────────────────────────────────────────────┐
│   extracting data signals of a watermark image from the Fourier │
│                          coefficients                       │
└─────────────────────────────────────────────────────────────┘
```

FIG. 5

METHOD OF ENCODING WATERMARK INTO DIGITAL IMAGE BY PARTITIONING IMAGE INTO BLOCKS OF A SAME SIZE, APPARATUS FOR ENCODING WATERMARK INTO DIGITAL IMAGE, AND METHOD OF DETECTING WATERMARK IN DIGITAL IMAGE THEREOF

CROSS-REFERENCE TO RELATED APPLICATION

This application is a national stage application under 35 U.S.C. § 371 of International Application No. PCT/CN2019/078272, filed Mar. 15, 2019, the contents of which are incorporated by reference in the entirety.

TECHNICAL FIELD

The present invention relates to display technology, more particularly, to a method of encoding a watermark into a digital image, an apparatus for encoding a watermark into a digital image, a method of detecting a watermark in a digital image, an apparatus for detecting a watermark in a digital image, and computer-program products.

BACKGROUND

Digital image watermarking technology have been widely used in copyright protection and as a means for claiming copyright. Typically, the watermark information is in a form of a binary number of several bits. The watermark information needs to be embedded into the digital image in a way that only minimally modifies the grayscale values of the red, green, and blue subpixels, making it difficult for human eyes to perceive the presence of the watermark.

SUMMARY

In one aspect, the present invention provides a method of encoding a watermark into a digital image, comprising partitioning an image into a plurality of blocks of a same size; accumulating the plurality of blocks of the same size into a single block image; performing a Fourier transformation on the single block image to obtain a two-dimensional Fourier spectrum defined by Fourier coefficients at different positions of a Fourier domain; inserting a watermark into a frequency domain of the two-dimensional Fourier spectrum by modifying the two-dimensional Fourier spectrum as a function of watermarking coefficients in the watermark, to obtain a modified Fourier spectrum; performing an inverse Fourier transformation on the modified Fourier spectrum to obtain a watermarked image; copying the watermarked image horizontally and vertically into a plurality of copied watermarked images; and splicing the plurality of copied watermarked images into a reconstituted watermark image having a same size as the image, a respective subpixel of the reconstituted watermark image corresponding to a respective subpixel of the image.

Optionally, performing the Fourier transformation on the single block image to obtain a two-dimensional Fourier spectrum comprises performing a Fourier transformation on a U component of the single block image in a YUV space to obtain the two-dimensional Fourier spectrum.

Optionally, the method further comprises generating adaptive coefficients respectively for a plurality of subpixels of the reconstituted watermark image based on grayscale values of different color components of a plurality of subpixels of the image, the adaptive coefficients generated for a respective one of the plurality of subpixels of the reconstituted watermark image comprising an upper limit and a lower limit.

Optionally, the lower limit is defined as max {AL1, AL2, AL3}; and the upper limit is defined as min {AH1, AH2, AH3}; wherein $$AL1 = \frac{-b}{2.03};$$

$$AL2 = \frac{-(255-g)}{0.39};$$

$$AL3 = \frac{-(r*0.299 + g*0.587 + 1)}{[(b*0.114 + 1)*2]};$$

$$AH1 = \frac{g}{0.39};$$

$$AH2 = \frac{(255-b)}{2.03}; \text{ and}$$

$$AH3 = \frac{(r*0.299 + g*0.587 + 1)}{[(b*0.114 + 1)*2]};$$

wherein r stands for a grayscale of a red component of the respective one of the plurality of subpixels of the image; g stands for a grayscale of a green component of the respective one of the plurality of subpixels of the image; and b stands for a grayscale of a blue component of the respective one of the plurality of subpixels of the image.

Optionally, the method further comprises respectively modifying data signals of the plurality of subpixels of the reconstituted watermark image by the upper limit and the lower limit thereby generating a modified watermark image comprising modified data signals; wherein, if a data signal of a respective one of the plurality of subpixels of the reconstituted watermark image is less than the lower limit, the data signal is modified to an assigned value of the lower limit; and if a data signal of a respective one of the plurality of subpixels of the reconstituted watermark image is greater than the upper limit, the data signal is modified to an assigned value of the upper limit.

Optionally, the method further comprises embedding the modified data signals of the modified watermark image into the image.

Optionally, performing the Fourier transformation on the single block image to obtain a two-dimensional Fourier spectrum comprises performing a Fourier transformation on a U component of the single block image in a YUV space to obtain the two-dimensional Fourier spectrum; and embedding the modified data signals of the modified watermark image into the image comprises embedding a modified data signal of the modified watermark image into a U component of the image in the YUV space.

Optionally, subsequent to embedding the modified data signal of the modified watermark image into a U component of the image in the YUV space, the method further comprises converting a format of the image from one in the YUV space into one in an RGB space.

Optionally, the image is an original image.

Optionally, the method further comprises converting an original image into the image; wherein a respective one of the plurality of blocks of the same size has a size of w×h subpixels; and the original image has a size of W×H subpixels, at least W is not an integral multiples of w; wherein converting the original image into the image comprises expanding the original image using dummy subpixels having zero values to generate the image; and the image has a size of W'×H' subpixels, wherein W' is an integral multiples of w, and H'≥H.

Optionally, inserting the watermark into the frequency domain of the two-dimensional Fourier spectrum comprises inserting N numbers of binary numbers into the frequency domain of the two-dimensional Fourier spectrum; wherein inserting the N numbers of binary numbers into the frequency domain of the two-dimensional Fourier spectrum comprises selecting N pairs of frequency points in the frequency domain of the two-dimensional Fourier spectrum corresponding to the N numbers of binary numbers, a respective one of the N numbers of binary numbers is represented as B(n), 1≤n≤N, a respective one of the N pairs of frequency points is represented as {[x1(n), y1(n)], [x2(n), y2(n)]}, x and y stand for coordinates of a frequency point along a horizontal axis and a vertical axis; calculating amplitudes of frequency points of the respective pair of the N pairs of frequency points, the amplitudes are represented as A1(n) and A2(n), respectively; if B(n) has a value of 1, modifying an amplitude of a frequency point [x1(n), y1(n)] to a value of TH+A2(n)−A1(n) while maintaining an argument of the frequency point [x1(n), y1(n)] unchanged, and modifying a coefficient of a frequency point [x2(n), y2(n)] to a value of 0; if B(n) has a value of 0, modifying an amplitude of a frequency point [x1(n), y1(n)] to a value of TH+A1(n)−A2(n) while maintaining an argument of the frequency point [x1(n), y1(n)] unchanged, and modifying a coefficient of a frequency point [x2(n), y2(n)] to a value of 0; and assigning 0 as values of coefficients of frequency points other than the frequency points of the N pairs of frequency points; wherein TH stands for a degree of embedding strength of the watermark.

In another aspect, the present invention provides an apparatus for encoding a watermark into a digital image, comprising a memory; and one or more processors; wherein the memory and the one or more processors are connected with each other; and the memory stores computer-executable instructions for controlling the one or more processors to partition an image into a plurality of blocks of a same size; accumulate the plurality of blocks of the same size into a single block image; perform a Fourier transformation on the single block image to obtain a two-dimensional Fourier spectrum defined by Fourier coefficients at different positions of a Fourier domain; insert a watermark into a frequency domain of the two-dimensional Fourier spectrum by modifying the two-dimensional Fourier spectrum as a function of watermarking coefficients in the watermark, to obtain a modified Fourier spectrum; perform an inverse Fourier transformation on the modified Fourier spectrum to obtain a watermarked image; copy the watermarked image horizontally and vertically into a plurality of copied watermarked images; and splice the plurality of copied watermarked images into a reconstituted watermark image having a same size as the image, a respective subpixel of the reconstituted watermark image corresponding to a respective subpixel of the image.

In another aspect, the present invention provides a computer-program product comprising a non-transitory tangible computer-readable medium having computer-readable instructions thereon, the computer-readable instructions being executable by a processor to cause the processor to perform partitioning an image into a plurality of blocks of a same size; accumulating the plurality of blocks of the same size into a single block image; performing a Fourier transformation on the single block image to obtain a two-dimensional Fourier spectrum defined by Fourier coefficients at different positions of a Fourier domain; inserting a watermark into a frequency domain of the two-dimensional Fourier spectrum by modifying the two-dimensional Fourier spectrum as a function of watermarking coefficients in the watermark, to obtain a modified Fourier spectrum; performing an inverse Fourier transformation on the modified Fourier spectrum to obtain a watermarked image; copying the watermarked image horizontally and vertically into a plurality of copied watermarked images; and splicing the plurality of copied watermarked images into a reconstituted watermark image having a same size as the image, a respective subpixel of the reconstituted watermark image corresponding to a respective subpixel of the image.

In another aspect, the present invention provides a method of detecting a watermark in a digital image, comprising partitioning an image into a plurality of blocks of a same size; accumulating the plurality of blocks of the same size into a single block image; performing a Fourier transformation on the single block image to obtain a two-dimensional Fourier spectrum defined by Fourier coefficients at different positions of a Fourier domain; and extracting data signals of a watermark image from the Fourier coefficients.

Optionally, performing the Fourier transformation on the single block image to obtain a two-dimensional Fourier spectrum comprises performing a Fourier transformation on a U component of the single block image in a YUV space to obtain the two-dimensional Fourier spectrum.

Optionally, prior to partitioning the image into the plurality of blocks of the same size, the method further comprises converting a format of the image from one in an RGB space into one in the YUV space; wherein partitioning the image into a plurality of blocks of a same size comprises partitioning a U component of the image into the plurality of blocks of a same size.

Optionally, the method further comprises converting an original image into the image; wherein a respective one of the plurality of blocks of the same size has a size of w×h subpixels; and the original image has a size of W×H subpixels, at least W is not an integral multiples of w; wherein converting the original image into the image comprises expanding the original image using dummy subpixels having zero values to generate the image; and the image has a size of W'×H' subpixels, wherein W' is an integral multiples of w, and H'≥H.

Optionally, the data signals of the watermark image comprise N numbers of binary numbers, a respective one of the N numbers of binary numbers is represented as B(n), 1≤n≤N; wherein extracting the data signals of the watermark image from the Fourier coefficients comprises selecting N pairs of frequency points in a frequency domain of the two-dimensional Fourier spectrum corresponding to the N numbers of binary numbers, a respective one of the N pairs of frequency points is represented as {[x1(n), y1(n)], [x2(n), y2(n)]}, x and y stand for coordinates of a frequency point along a horizontal axis and a vertical axis; calculating amplitudes of frequency points of the respective pair of the N pairs of frequency points, the amplitudes are represented as A1(n) and A2(n), respectively; determining a value of B(n) to be 1 if A1(n) is greater than A2(n); and determining a value of B(n) to be 0 if A1(n) is less than A2(n).

In another aspect, the present invention provides an apparatus for detecting a watermark in a digital image, comprising a memory; and one or more processors; wherein the memory and the one or more processors are connected with each other; and the memory stores computer-executable instructions for controlling the one or more processors to partition an image into a plurality of blocks of a same size;

accumulate the plurality of blocks of the same size into a single block image; perform a Fourier transformation on the single block image to obtain a two-dimensional Fourier spectrum defined by Fourier coefficients at different positions of a Fourier domain; and extract data signals of a watermark image from the Fourier coefficients.

In another aspect, the present invention provides a computer-program product comprising a non-transitory tangible computer-readable medium having computer-readable instructions thereon, the computer-readable instructions being executable by a processor to cause the processor to perform partitioning an image into a plurality of blocks of a same size; accumulating the plurality of blocks of the same size into a single block image; performing a Fourier transformation on the single block image to obtain a two-dimensional Fourier spectrum defined by Fourier coefficients at different positions of a Fourier domain; and extracting data signals of a watermark image from the Fourier coefficients.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter aa, a method of encoding a watermark into a digital image, an apparatus for encoding a watermark into a digital image, a method of detecting a watermark in a digital image, an apparatus for detecting a watermark in a digital image, and computer-program products that substantially obviate one or more of the problems due to limitations and disadvantages of the related art. In one aspect, the present disclosure provides a method of encoding a watermark into a digital image. In some embodiments, the method includes partitioning an image into a plurality of blocks of a same size; accumulating the plurality of blocks of the same size into a single block image; performing a Fourier transformation on the single block image to obtain a two-dimensional Fourier spectrum defined by Fourier coefficients at different positions of a Fourier domain; inserting a watermark into a frequency domain of the two-dimensional Fourier spectrum by modifying the two-dimensional Fourier spectrum as a function of watermarking coefficients in the watermark, to obtain a modified Fourier spectrum; performing an inverse Fourier transformation on the modified Fourier spectrum to obtain a watermarked image; copying the watermarked image horizontally and vertically into a plurality of copied watermarked images; and splicing the plurality of copied watermarked images into a reconstituted watermark image having a same size as the image, a respective subpixel of the reconstituted watermark image corresponding to a respective subpixel of the image.

Figure 1:
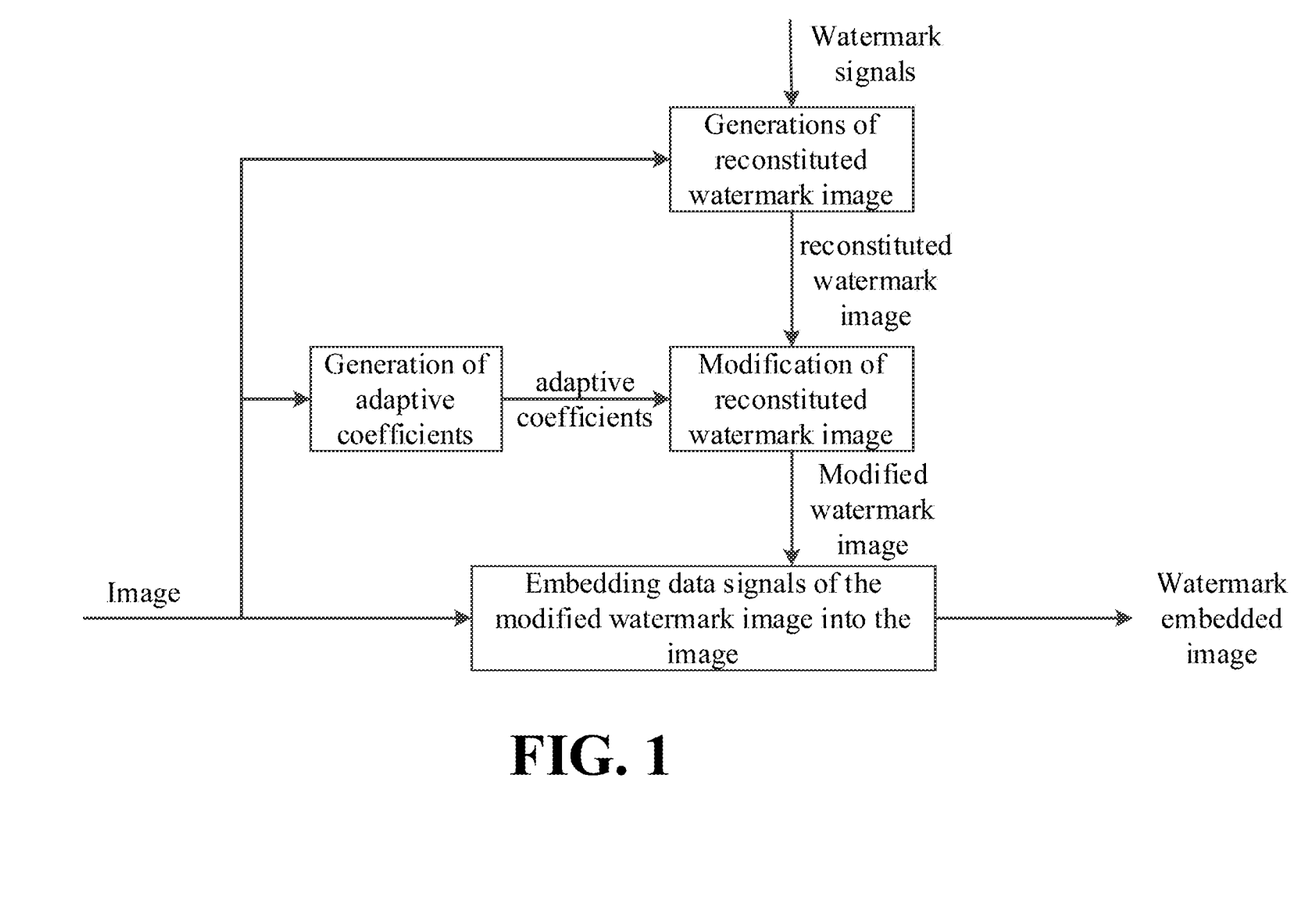
FIG. 1 illustrates a process of encoding a watermark into a digital image in some embodiments according to the present disclosure.

FIG. 1 illustrates a process of encoding a watermark into a digital image in some embodiments according to the present disclosure. Referring to FIG. 1, the process in some embodiments includes inputting an image, generating a reconstituted watermark image using watermark signals and the inputted image. The process further includes generating adaptive coefficients based on the inputted image; and modifying the reconstituted watermark image using the adaptive coefficients to generate a modified watermark image. The process further includes embedding data signals of the modified watermark image into the image to generate a watermark embedded image. Optionally, the watermark signals are binary watermark signals. Optionally, modification of the reconstituted watermark image using the adaptive coefficients includes limiting amplitudes of a component of the reconstituted watermark image by an upper limit and/or a lower limit provided by the adaptive coefficients. Thus, in some embodiments, the present method includes one or any combinations of the steps of generation of a reconstituted watermark image, generation of adaptive coefficients, modification of the reconstituted watermark image, and embedding data signals of the modified watermark image into the image.

Figure 2:
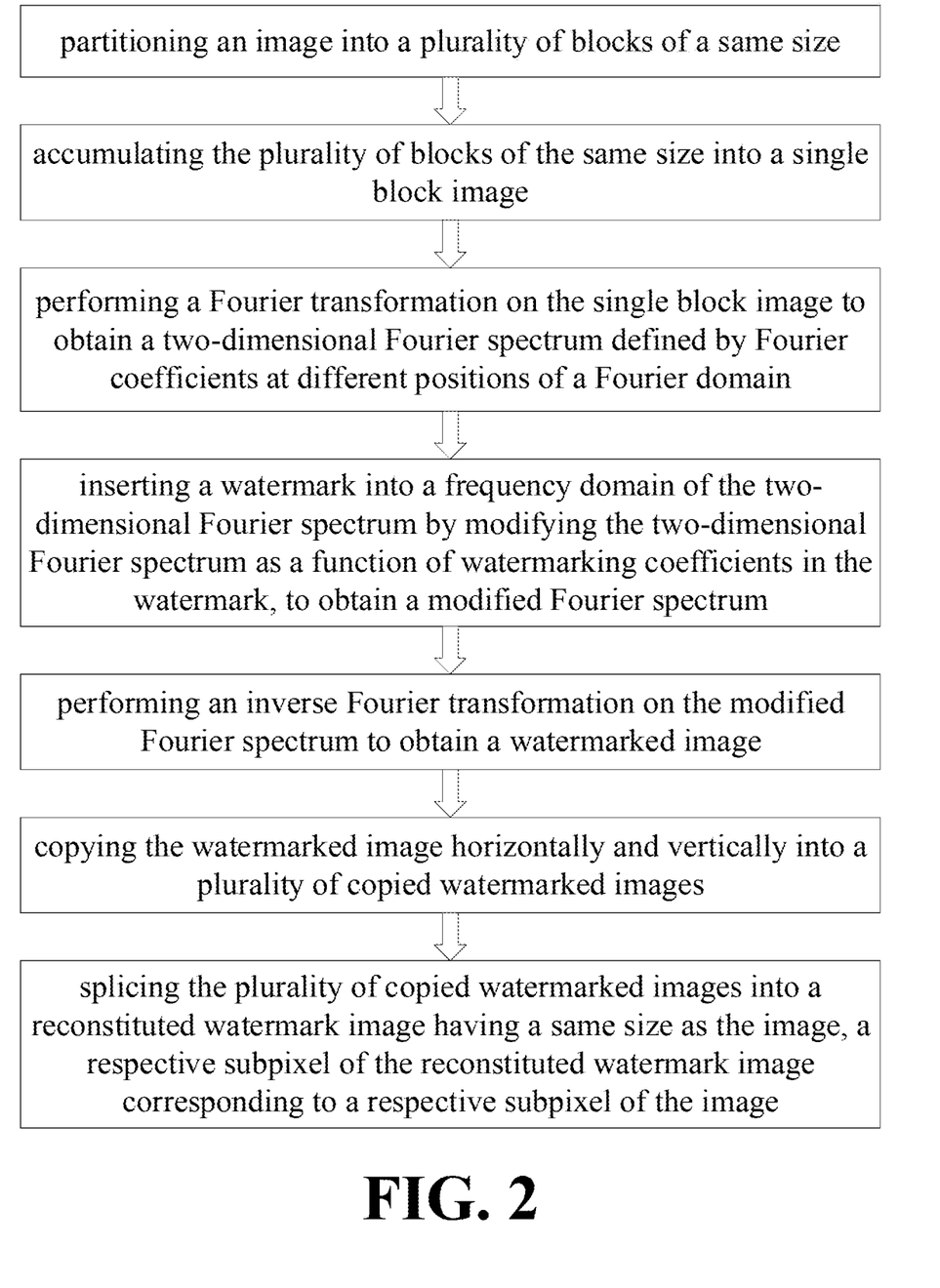
FIG. 2 is a flow chart illustrating a method of encoding a watermark into a digital image in some embodiments according to the present disclosure.

FIG. 2 is a flow chart illustrating a method of encoding a watermark into a digital image in some embodiments according to the present disclosure. Referring to FIG. 2, the method in some embodiments includes partitioning an image into a plurality of blocks of a same size; accumulating the plurality of blocks of the same size into a single block image; performing a Fourier transformation on the single block image to obtain a two-dimensional Fourier spectrum defined by Fourier coefficients at different positions of a Fourier domain; inserting a watermark into a frequency domain of the two-dimensional Fourier spectrum by modifying the two-dimensional Fourier spectrum as a function of watermarking coefficients in the watermark, to obtain a modified Fourier spectrum; performing an inverse Fourier transformation on the modified Fourier spectrum to obtain a watermarked image; copying the watermarked image horizontally and vertically into a plurality of copied watermarked images; and splicing the plurality of copied watermarked images into a reconstituted watermark image having a same size as the image, a respective subpixel of the reconstituted watermark image corresponding to a respective subpixel of the image.

In the present method, before the Fourier transformation is performed, the image is first partitioned into a plurality of blocks of a same size, and then the plurality of blocks of the same size are accumulated into a single block image. By first partitioning the image into a plurality of blocks of a same size, the computational task is much simplified and demands on the computational resources needed for performing the Fourier transformation is much reduced. For example, the amount of the computational task is proportional to $N^2 \log_2(N)$ for an image of N×N subpixels, which increases exponentially with an increase of the image size. By first partitioning the image into a plurality of blocks of a same size, the amount of the computational task is significantly reduced.

In some embodiments, accumulating the plurality of blocks of the same size into a single block image includes, for each subpixel, accumulating each component of the plurality of blocks of the same size. In one example, for each subpixel, grayscales of the plurality of blocks of the same size are accumulated. In another example, for each subpixel, grayscales of red components of the plurality of blocks of the same size are accumulated, grayscales of green components of the plurality of blocks of the same size are accumulated, grayscales of blue components of the plurality of blocks of the same size are accumulated. In another example, a YUV space is used, for each subpixel, U components of the plurality of blocks of the same size are accumulated. In another example, a YUV space is used, for each subpixel, U components of the plurality of blocks of the same size are accumulated, Y components of the plurality of blocks of the same size are accumulated, and V components of the plurality of blocks of the same size are accumulated.

Human eyes are less sensitive to blue color. Accordingly, in some embodiments, the watermark may be inserted into a U component of the image. By doing so, the impact of the watermark on image quality and user viewing experience can be minimized while still ensuring watermark embedding strength. In some embodiments, performing the Fourier transformation on the single block image to obtain a two-dimensional Fourier spectrum includes performing a Fourier transformation on a U component of the single block image in a YUV space to obtain the two-dimensional Fourier spectrum.

Optionally, the method further includes converting the format of the single block image from one in an RGB space into one in a YUV space. The U component of the single block image is then extracted, and the Fourier transformation is performed on the U component of the single block image to obtain the two-dimensional Fourier spectrum. Subsequently, the watermark is inserted into the Fourier spectrum of the U component of the single block image.

Optionally, the method further includes converting a format of the image from one in an RGB space into one in a YUV space. The U component of the image is then extracted, and the U-component image is then partitioned into the plurality of blocks of a same size. The plurality of blocks of a same size partitioned from the U-component image is then accumulated into the single block image of the U component. Subsequently, the Fourier transformation is performed on the single block image of the U component to obtain the two-dimensional Fourier spectrum, and the watermark is inserted into the Fourier spectrum of the single block image of the U component.

In one example, the image has a size of W×H subpixels, wherein W is the total number of subpixels along a width direction, and H is the total number of subpixels along a height direction. In some embodiments, W is an integral multiples of 128, e.g., m×128, m≥1. H is an integral multiples of 128, e.g., n×128, n≥1. When m=1, n>1. When n=1, m>1. The image can be partitioned into a plurality of blocks, each having a size of 128×128 subpixels. The plurality of blocks of 128×128 subpixels are accumulated to obtain a single block image having a size of 128×128 subpixels.

In another example, the image has a size of W×H subpixels, wherein W is the total number of subpixels along a width direction, and H is the total number of subpixels along a height direction. In some embodiments, W is an integral multiples of 128, e.g., m×128, m≥1. H is an integral multiples of 128, e.g., n×128, n≥1. When m=1, n>1. When n=1, m>1. In another example, a U-component image is extracted from the image, the U-component image has a size of W×H subpixels. The U-component image can be partitioned into a plurality of blocks, each having a size of 128×128 subpixels. The plurality of blocks of 128×128 subpixels are accumulated to obtain a single block image having a size of 128×128 subpixels.

Figure 3:
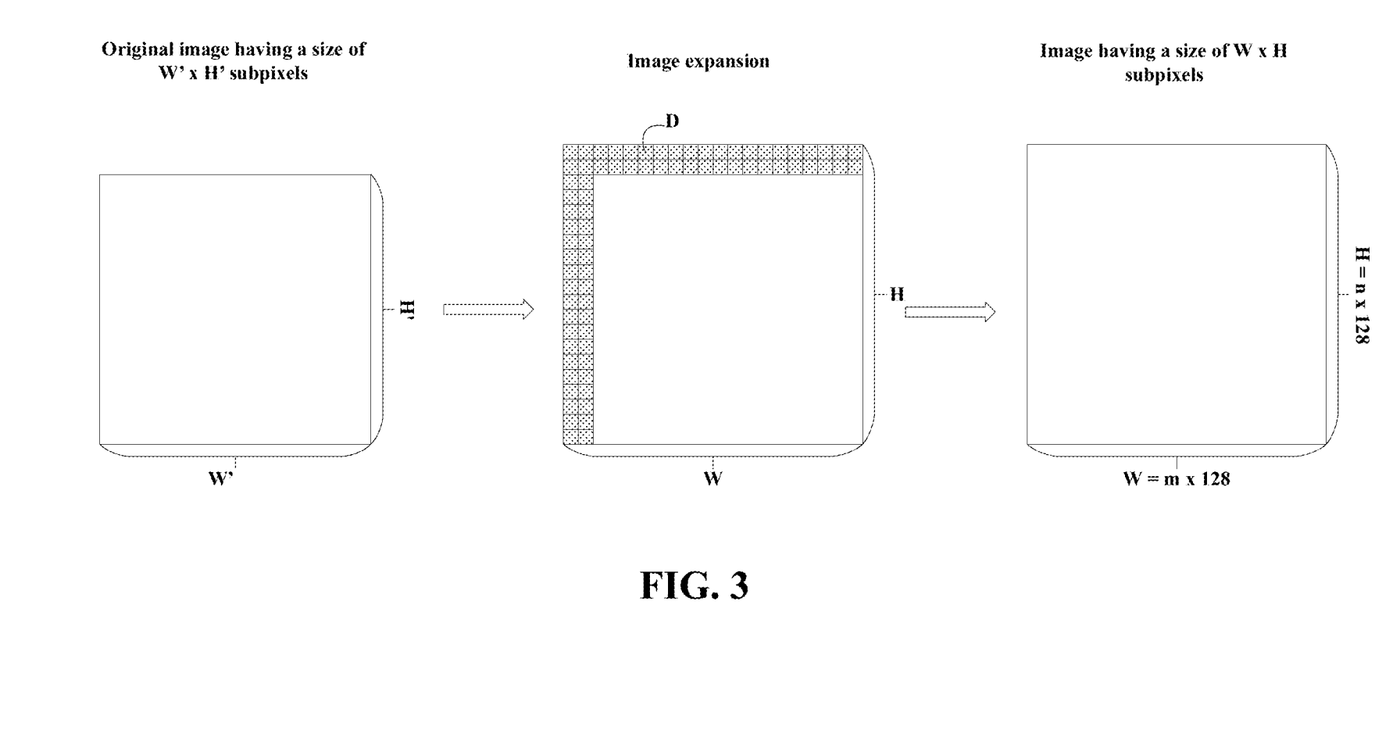
FIG. 3 illustrates expanding an original image into an image having a size of W×H subpixels in some embodiments according to the present disclosure.

In some embodiments, an original image has a size of W'×H' subpixels, wherein at least W' is not an integral multiples of 128. Optionally, the method further includes converting an original image into the image. Optionally, a respective one of the plurality of blocks of the same size has a size of w×h subpixels; and the original image has a size of W×H subpixels, at least W is not an integral multiples of w. Optionally, converting the original image into the image includes expanding the original image with subpixels having zero values to generate the image. The image has a size of W'×H' subpixels, wherein W' is an integral multiples of w, and H'≥H.

FIG. 3 illustrates expanding an original image into an image having a size of W×H subpixels in some embodiments according to the present disclosure. Referring to FIG. 3, W' is not an integral multiples of 128, and H' is not an integral multiples of 128. The method further includes expanding the original image having the size of W'×H' subpixels using dummy subpixels D having zero values to generate the image having a size of W×H subpixels, wherein W is an integral multiples of 128, e.g., m×128, m≥1; H is an integral multiples of 128, e.g., n×128, n≥1. When m=1, n>1. When n=1, m>1.

Figure 4:
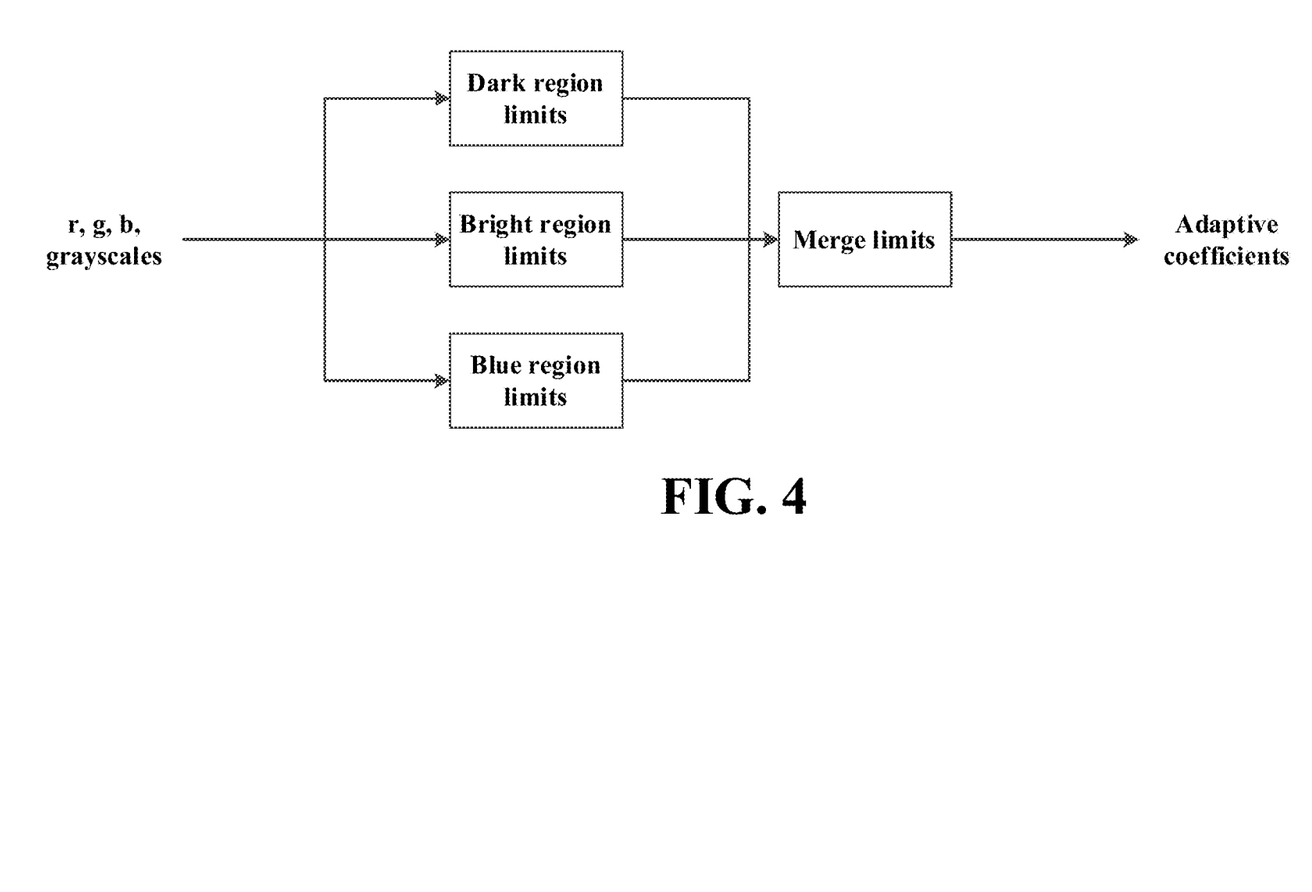
FIG. 4 illustrates a process of generating adaptive coefficients for a subpixel based on grayscale values of different color components in some embodiments according to the present disclosure.

It is discovered in the present disclosure that different regions of the image have different abilities in terms of blending in the watermark. For example, a dark region, a bright region, or a blue region has a relatively poor ability to "hide" the watermark embedded therein. Accordingly, these regions can tolerate a relatively small watermark signal without affecting image quality by the watermark, as compared to other regions of the image. This is particularly true when the watermark is inserted into the frequency domain of the two-dimensional Fourier spectrum resulting from a Fourier transformation performed on a U-component image. In some embodiments, adaptive coefficients are generated to limit the watermark signal in the watermark image.

In some embodiments, the method further includes generating adaptive coefficients based on grayscale values of different color components of a plurality of subpixels of the image. Optionally, the adaptive coefficient generated for a respective one of the plurality of subpixels of the reconstituted watermark image include an upper limit and a lower limit.

FIG. 4 illustrates a process of generating adaptive coefficients for a subpixel based on grayscale values of different color components in some embodiments according to the present disclosure. Referring to FIG. 4, the adaptive coefficient limits of the dark region, the bright region, and the blue region, are respectively calculated based on grayscale values of the red color component, the green color component, and the blue color component. The adaptive coefficient limits of the dark region, the bright region, and the blue region are then merged to obtain merged limits, thereby generating the adaptive coefficients for the subpixel.

In some embodiments, the merged limits includes a lower limit and an upper limit. The lower limit is defined as max {AL1, AL2, AL3}, e.g., the maximum of AL1, AL2, and AL3. The upper limit is defined as min {AH1, AH2, AH3}, e.g., the minimum of AH1, AH2, and AH3. In some embodiments, AL1, AL2, AL3, AH1, AH2, AH3 are defined as follows:

$$AL1 = \frac{-b}{2.03};$$

$$AL2 = \frac{-(255-g)}{0.39};$$

$$AL3 = \frac{-(r*0.299+g*0.587+1)}{[(b*0.114+1)*2]};$$

$$AH1 = \frac{g}{0.39};$$

$$AH2 = \frac{(255-b)}{2.03}; \text{ and}$$

$$AH3 = \frac{(r*0.299+g*0.587+1)}{[(b*0.114+1)*2]};$$

wherein r stands for a grayscale of a red component of the respective one of the plurality of subpixels of the image; g stands for a grayscale of a green component of the respective one of the plurality of subpixels of the image; and b stands for a grayscale of a blue component of the respective one of the plurality of subpixels of the image.

Optionally, each of AL1, AL2, AL3 has a negative value, and the lower limit of the merged limits is the maximum of AL1, AL2, and AL (the least negative one). Optionally, each of AH1, AH2, AH3 has a positive value, and the upper limit of the merged limits is the minimum of AH1, AH2, and AH3 (the least positive one).

Optionally, AL1 and AH1 are referred to as limits of the dark region. Optionally, AL2 and AH2 are referred to as limits of the bright region. Optionally, AL3 and AH3 are referred to as limits of the blue region.

Referring to FIG. 1, once the reconstituted watermark image and the adaptive coefficients are generated, the reconstituted watermark image is modified to generate a modified watermark image. In some embodiments, the method further includes respectively modifying data signals of the plurality of subpixels of the reconstituted watermark image by the upper limit and the lower limit thereby generating a modified watermark image having modified data signals. The adaptive coefficients limit the data signal of a respective one of the plurality of subpixels in the reconstituted watermark image to be between the upper limit and the lower limit as described above. In one example, if a data signal of a respective one of the plurality of subpixels of the reconstituted watermark image is less than the lower limit, the data signal is modified to an assigned value of the lower limit. In another example, if a data signal of a respective one of the plurality of subpixels of the reconstituted watermark image is greater than the upper limit, the data signal is modified to an assigned value of the upper limit.

Referring to FIG. 1, the method in some embodiments further includes embedding the modified data signals of the modified watermark image into the image, thereby generating a watermark embedded image. In some embodiments, performing the Fourier transformation on the single block image to obtain a two-dimensional Fourier spectrum includes performing a Fourier transformation on a U component of the single block image in a YUV space to obtain the two-dimensional Fourier spectrum. In some embodiments, embedding the modified data signals of the modified watermark image into the image includes embedding a modified data signal of the modified watermark image into a U component of the image in the YUV space.

In some embodiments, the method further includes, subsequent to embedding the modified data signal of the modified watermark image into a U component of the image in the YUV space, converting a format of the image from one in the YUV space including the modified U component, a Y component, and a V component, into one in an RGB space.

In some embodiments, the step of inserting the watermark into the frequency domain of the two-dimensional Fourier spectrum includes inserting N numbers of binary numbers into the frequency domain of the two-dimensional Fourier spectrum, a respective one of the N numbers of binary numbers is represented as $B(n)$, $1 \le n \le N$. Optionally, the step of inserting the N numbers of binary numbers into the frequency domain of the two-dimensional Fourier spectrum includes selecting N pairs of frequency points in the frequency domain of the two-dimensional Fourier spectrum corresponding to the N numbers of binary numbers, a respective one of the N numbers of binary numbers is represented as $B(n)$, $1 \le n$ N, a respective one of the N pairs of frequency points is represented as $\{[x1(n), y1(n)], [x2(n), y2(n)]\}$, x and y stand for coordinates of a frequency point along a horizontal axis and a vertical axis; and calculating amplitudes of frequency points of the respective pair of the N pairs of frequency points, the amplitudes are represented as $A1(n)$ and $A2(n)$, respectively.

Optionally, if $B(n)$ has a value of 1, modifying an amplitude of a frequency point $[x1(n), y1(n)]$ to a value of $TH+A2(n)-A1(n)$ while maintaining an argument of the frequency point $[x1(n), y1(n)]$ unchanged, and modifying a coefficient of a frequency point $[x2(n), y2(n)]$ to a value of 0.

Optionally, if $B(n)$ has a value of 0, modifying an amplitude of a frequency point $[x1(n), y1(n)]$ to a value of $TH+A1(n)-A2(n)$ while maintaining an argument of the frequency point $[x1(n), y1(n)]$ unchanged, and modifying a coefficient of a frequency point $[x2(n), y2(n)]$ to a value of 0.

Optionally, the step of inserting the N numbers of binary numbers into the frequency domain of the two-dimensional Fourier spectrum further includes assigning 0 as values of coefficients of frequency points other than the frequency points of the N pairs of frequency points.

TH stands for a degree of embedding strength of the watermark. The higher the TH, the higher a degree of embedding strength of the watermark. Optionally, TH can be assigned a value of 200, particularly when a relatively high image quality is desired.

In another aspect, the present disclosure provides an apparatus for encoding a watermark into a digital image. In some embodiments, the apparatus includes a memory and one or more processors. The memory and the one or more processors are connected with each other. In some embodiments, the memory stores computer-executable instructions for controlling the one or more processors to partition an image into a plurality of blocks of a same size; accumulate the plurality of blocks of the same size into a single block image; perform a Fourier transformation on the single block image to obtain a two-dimensional Fourier spectrum defined by Fourier coefficients at different positions of a Fourier domain; insert a watermark into a frequency domain of the two-dimensional Fourier spectrum by modifying the two-dimensional Fourier spectrum as a function of watermarking coefficients in the watermark, to obtain a modified Fourier spectrum; perform an inverse Fourier transformation on the modified Fourier spectrum to obtain a watermarked image;

copy the watermarked image horizontally and vertically into a plurality of copied watermarked images; and splice the plurality of copied watermarked images into a reconstituted watermark image having a same size as the image, a respective subpixel of the reconstituted watermark image corresponding to a respective subpixel of the image.

Various appropriate devices having data processing capabilities and/or instruction execution capabilities may be used as the one or more processors. Examples of the appropriate devices having data processing capabilities and/or instruction execution capabilities used as the one or more processors include, but not limited to, a central processing unit (CPU), a tensor processor (TPU), or a graphics processor (GPU). Optionally, the CPU can be X86 or ARM architecture. Optionally, the one or more processors can control other devices in the apparatus for encoding a watermark into a digital image.

In some embodiment, the memory can be a volatile memory or a non-volatile memory. Optionally, the volatile memory can be a random-access memory (RAM) or a cache. Optionally, a non-volatile memory can be a read only memory (ROM), a hard disk, or a flash memory. Optionally, the memory stores computer-executable instructions for controlling the one or more processors to perform functions of the image processing apparatus. Optionally, the memory may store various applications and various data, including reference images, reference mask maps or data used or produced by the various applications.

In some embodiments, the memory stores computer-executable instructions for controlling the one or more processors to perform a Fourier transformation on a U component of the single block image in a YUV space to obtain the two-dimensional Fourier spectrum.

In some embodiments, the memory further stores computer-executable instructions for controlling the one or more processors to generate adaptive coefficients respectively for a plurality of subpixels of the reconstituted watermark image based on grayscale values of different color components of a plurality of subpixels of the image, the adaptive coefficients generated for a respective one of the plurality of subpixels of the reconstituted watermark image comprising an upper limit and a lower limit.

In some embodiments, the limits includes a lower limit and an upper limit. The lower limit is defined as max {AL1, AL2, AL3}, e.g., the maximum of AL1, AL2, and AL3. The upper limit is defined as min {AH1, AH2, AH3}, e.g., the minimum of AH1, AH2, and AH3. In some embodiments, AL1, AL2, AL3, AH1, AH2, AH3 are defined as follows:

$$AL1 = \frac{-b}{2.03};$$

$$AL2 = \frac{-(255-g)}{0.39};$$

$$AL3 = \frac{-(r*0.299 + g*0.587 + 1)}{[(b*0.114 + 1)*2]};$$

$$AH1 = \frac{g}{0.39};$$

$$AH2 = \frac{(255-b)}{2.03}; \text{ and}$$

$$AH3 = \frac{(r*0.299 + g*0.587 + 1)}{[(b*0.114 + 1)*2]};$$

wherein r stands for a grayscale of a red component of the respective one of the plurality of subpixels of the image; g stands for a grayscale of a green component of the respective one of the plurality of subpixels of the image; and b stands for a grayscale of a blue component of the respective one of the plurality of subpixels of the image.

In some embodiments, the memory further stores computer-executable instructions for controlling the one or more processors to respectively modify data signals of the plurality of subpixels of the reconstituted watermark image by the upper limit and the lower limit thereby generating a modified watermark image comprising modified data signals. If a data signal of a respective one of the plurality of subpixels of the reconstituted watermark image is less than the lower limit, the data signal is modified to an assigned value of the lower limit. If a data signal of a respective one of the plurality of subpixels of the reconstituted watermark image is greater than the upper limit, the data signal is modified to an assigned value of the upper limit.

In some embodiments, the memory further stores computer-executable instructions for controlling the one or more processors to embed the modified data signals of the modified watermark image into the image. Optionally, the memory stores computer-executable instructions for controlling the one or more processors to embed a modified data signal of the modified watermark image into a U component of the image in the YUV space.

In some embodiments, the memory further stores computer-executable instructions for controlling the one or more processors to convert a format of the image from one in the YUV space into one in an RGB space.

Optionally, the image is an original image.

In some embodiments, the memory further stores computer-executable instructions for controlling the one or more processors to convert an original image into the image. Optionally, a respective one of the plurality of blocks of the same size has a size of w×h subpixels; and the original image has a size of W×H subpixels, at least W is not an integral multiples of w. Optionally, the memory further stores computer-executable instructions for controlling the one or more processors to expand the original image with subpixels having zero values to generate the image. The image has a size of W'×H' subpixels, wherein W' is an integral multiples of w, and H'≥H.

In some embodiments, the memory further stores computer-executable instructions for controlling the one or more processors to insert N numbers of binary numbers into the frequency domain of the two-dimensional Fourier spectrum. Optionally, the memory further stores computer-executable instructions for controlling the one or more processors to select N pairs of frequency points in the frequency domain of the two-dimensional Fourier spectrum corresponding to the N numbers of binary numbers, a respective one of the N numbers of binary numbers is represented as $B(n)$, $1 \leq n \leq N$, a respective one of the N pairs of frequency points is represented as $\{[x1(n), y1(n)], [x2(n), y2(n)]\}$, x and y stand for coordinates of a frequency point along a horizontal axis and a vertical axis; and calculate amplitudes of frequency points of the respective pair of the N pairs of frequency points, the amplitudes are represented as $A1(n)$ and $A2(n)$, respectively. If $B(n)$ has a value of 1, modifying an amplitude of a frequency point $[x1(n), y1(n)]$ to a value of $TH+A2(n)-A1(n)$ while maintaining an argument of the frequency point $[x1(n), y1(n)]$ unchanged, and modifying a coefficient of a frequency point $[x2(n), y2(n)]$ to a value of 0. If $B(n)$ has a value of 0, modifying an amplitude of a frequency point $[x1(n), y1(n)]$ to a value of $TH+A1(n)-A2(n)$ while maintaining an argument of the frequency point $[x1(n), y1(n)]$ unchanged, and modifying a coefficient of a frequency point $[x2(n), y2(n)]$ to a value of 0.

Optionally, the memory further stores computer-executable instructions for controlling the one or more processors to assigning 0 as values of coefficients of frequency points other than the frequency points of the N pairs of frequency points. TH stands for a degree of embedding strength of the watermark.

In another aspect, the present disclosure provides a computer-program product including a non-transitory tangible computer-readable medium having computer-readable instructions thereon. In some embodiments, the computer-readable instructions being executable by a processor to cause the processor to perform partitioning an image into a plurality of blocks of a same size; accumulating the plurality of blocks of the same size into a single block image; performing a Fourier transformation on the single block image to obtain a two-dimensional Fourier spectrum defined by Fourier coefficients at different positions of a Fourier domain; inserting a watermark into a frequency domain of the two-dimensional Fourier spectrum by modifying the two-dimensional Fourier spectrum as a function of watermarking coefficients in the watermark, to obtain a modified Fourier spectrum; performing an inverse Fourier transformation on the modified Fourier spectrum to obtain a watermarked image; copying the watermarked image horizontally and vertically into a plurality of copied watermarked images; and splicing the plurality of copied watermarked images into a reconstituted watermark image having a same size as the image, a respective subpixel of the reconstituted watermark image corresponding to a respective subpixel of the image.

Figure 5:
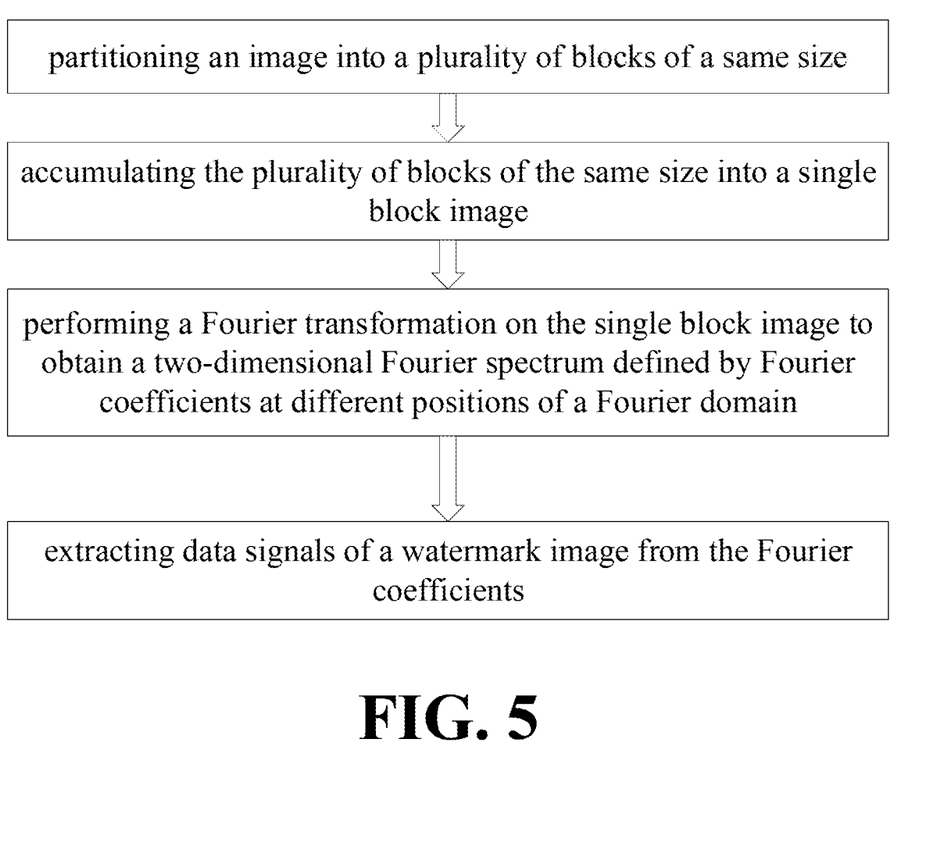
FIG. 5 is a flow chart illustrating a method of detecting a watermark in a digital image in some embodiments according to the present disclosure

In another aspect, the present disclosure provides a method of detecting a watermark in a digital image. FIG. 5 is a flow chart illustrating a method of detecting a watermark in a digital image in some embodiments according to the present disclosure. Referring to FIG. 5, the method in some embodiments includes partitioning an image into a plurality of blocks of a same size; accumulating the plurality of blocks of the same size into a single block image; performing a Fourier transformation on the single block image to obtain a two-dimensional Fourier spectrum defined by Fourier coefficients at different positions of a Fourier domain; and extracting data signals of a watermark image from the Fourier coefficients.

In some embodiments, performing the Fourier transformation on the single block image to obtain a two-dimensional Fourier spectrum includes performing a Fourier transformation on a U component of the single block image in a YUV space to obtain the two-dimensional Fourier spectrum.

In some embodiments, the method further includes, prior to partitioning the image into the plurality of blocks of the same size, converting a format of the image from one in an RGB space into one in the YUV space. Optionally, partitioning the image into a plurality of blocks of a same size includes partitioning a U component of the image into the plurality of blocks of a same size.

In one example, the image has a size of W×H subpixels, wherein W is the total number of subpixels along a width direction, and H is the total number of subpixels along a height direction. In some embodiments, W is an integral multiples of 128, e.g., m×128, m≥1. H is an integral multiples of 128, e.g., n×128, n≥1. When m=1, n>1. When n=1, m>1. The image can be partitioned into a plurality of blocks, each having a size of 128×128 subpixels. The plurality of blocks of 128×128 subpixels are accumulated to obtain a single block image having a size of 128×128 subpixels.

In another example, the image has a size of W×H subpixels, wherein W is the total number of subpixels along a width direction, and H is the total number of subpixels along a height direction. In some embodiments, W is an integral multiples of 128, e.g., m×128, m≥1. H is an integral multiples of 128, e.g., n×128, n≥1. When m=1, n>1. When n=1, m>1. In another example, a U-component image is extracted from the image, the U-component image has a size of W×H subpixels. The U-component image can be partitioned into a plurality of blocks, each having a size of 128×128 subpixels. The plurality of blocks of 128×128 subpixels are accumulated to obtain a single block image having a size of 128×128 subpixels.

In some embodiments, an original image has a size of W'×H' subpixels, wherein at least W' is not an integral multiples of 128. The method further includes converting the original image into the image. Optionally, a respective one of the plurality of blocks of the same size has a size of w×h subpixels; and the original image has a size of W×H subpixels, at least W is not an integral multiples of w. Optionally, converting the original image into the image includes expanding the original image with subpixels having zero values to generate the image. The image has a size of W'×H' subpixels, wherein W' is an integral multiples of w, and H' H.

In another example, W' is not an integral multiples of 128, and H' is not an integral multiples of 128. The method further includes expanding the original image having the size of W'×H' subpixels using dummy subpixels D having zero values to generate the image having a size of W×H subpixels, wherein W is an integral multiples of 128, e.g., m×128, m≥1; H is an integral multiples of 128, e.g., n×128, n≥1. When m=1, n>1. When n=1, m>1.

In some embodiments, the data signals of the watermark image comprise N numbers of binary numbers, a respective one of the N numbers of binary numbers is represented as B(n), 1≤n≤N. In some embodiments, the step of extracting the data signals of the watermark image from the Fourier coefficients includes selecting N pairs of frequency points in a frequency domain of the two-dimensional Fourier spectrum corresponding to the N numbers of binary numbers, a respective one of the N pairs of frequency points is represented as {[x1(n), y1(n)], [x2(n), y2(n)]}, x and y stand for coordinates of a frequency point along a horizontal axis and a vertical axis; and calculating amplitudes of frequency points of the respective pair of the N pairs of frequency points, the amplitudes are represented as A1(n) and A2(n), respectively.

Optionally, the method further includes determining a value of B(n) to be 1 if A1(n) is greater than A2(n).

Optionally, the method further includes determining a value of B(n) to be 0 if A1(n) is less than A2(n).

In another aspect, the present disclosure provides an apparatus for detecting a watermark in a digital image. In some embodiments, the apparatus includes a memory and one or more processors. The memory and the one or more processors are connected with each other. In some embodiments, the memory stores computer-executable instructions for controlling the one or more processors to accumulate the plurality of blocks of the same size into a single block image; perform a Fourier transformation on the single block image to obtain a two-dimensional Fourier spectrum defined by Fourier coefficients at different positions of a Fourier domain; and extract data signals of a watermark image from the Fourier coefficients.

In some embodiments, the memory stores computer-executable instructions for controlling the one or more processors to perform a Fourier transformation on a U component of the single block image in a YUV space to obtain the two-dimensional Fourier spectrum. Optionally, the memory further stores computer-executable instructions for controlling the one or more processors to convert a format of the image from one in an RGB space into one in the YUV space; and partition a U component of the image into the plurality of blocks of a same size.

Optionally, the image is an original image.

In some embodiments, the memory further stores computer-executable instructions for controlling the one or more processors to convert an original image into the image. Optionally, a respective one of the plurality of blocks of the same size has a size of w×h subpixels; and the original image has a size of W×H subpixels, at least W is not an integral multiples of w. Optionally, the memory further stores computer-executable instructions for controlling the one or more processors to expand the original image with subpixels having zero values to generate the image. The image has a size of W'×H' subpixels, wherein W' is an integral multiples of w, and H'≥H.

In some embodiments, the data signals of the watermark image comprise N numbers of binary numbers, a respective one of the N numbers of binary numbers is represented as B(n), 1≤n≤N. In some embodiments, the memory further stores computer-executable instructions for controlling the one or more processors to select N pairs of frequency points in a frequency domain of the two-dimensional Fourier spectrum corresponding to the N numbers of binary numbers, a respective one of the N pairs of frequency points is represented as {[x1(n), y1(n)], [x2(n), y2(n)]}, x and y stand for coordinates of a frequency point along a horizontal axis and a vertical axis; and calculate amplitudes of frequency points of the respective pair of the N pairs of frequency points, the amplitudes are represented as A1(n) and A2(n), respectively. Optionally, the memory further stores computer-executable instructions for controlling the one or more processors to determining a value of B(n) to be 1 if A1(n) is greater than A2(n). Optionally, the memory further stores computer-executable instructions for controlling the one or more processors to determine a value of B(n) to be 0 if A1(n) is less than A2(n).

In another aspect, the present disclosure provides a computer-program product including a non-transitory tangible computer-readable medium having computer-readable instructions thereon. In some embodiments, the computer-readable instructions being executable by a processor to cause the processor to perform partitioning an image into a plurality of blocks of a same size; accumulating the plurality of blocks of the same size into a single block image; performing a Fourier transformation on the single block image to obtain a two-dimensional Fourier spectrum defined by Fourier coefficients at different positions of a Fourier domain; and extracting data signals of a watermark image from the Fourier coefficients.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A method of encoding a watermark into a digital image, comprising:
    partitioning an image into a plurality of blocks of a same size;
    accumulating the plurality of blocks of the same size into a single block image;
    performing a Fourier transformation on the single block image to obtain a two-dimensional Fourier spectrum defined by Fourier coefficients at different positions of a Fourier domain;
    inserting a watermark into a frequency domain of the two-dimensional Fourier spectrum by modifying the two-dimensional Fourier spectrum as a function of watermarking coefficients in the watermark, to obtain a modified Fourier spectrum;
    performing an inverse Fourier transformation on the modified Fourier spectrum to obtain a watermarked image;
    copying the watermarked image horizontally and vertically into a plurality of copied watermarked images; and
    splicing the plurality of copied watermarked images into a reconstituted watermark image having a same size as the image, a respective subpixel of the reconstituted watermark image corresponding to a respective subpixel of the image.

2. The method of claim 1, wherein performing the Fourier transformation on the single block image to obtain a two-dimensional Fourier spectrum comprises performing a Fourier transformation on a U component of the single block image in a YUV space to obtain the two-dimensional Fourier spectrum.

3. The method of claim 1, further comprising:
    generating adaptive coefficients respectively for a plurality of subpixels of the reconstituted watermark image based on grayscale values of different color components of a plurality of subpixels of the image, the adaptive coefficients generated for a respective one of the plurality of subpixels of the reconstituted watermark image comprising an upper limit and a lower limit.

4. The method of claim 3, wherein the lower limit is defined as max {AL1, AL2, AL3}; and
    the upper limit is defined as min {AH1, AH2, AH3};

wherein $$AL1 = \frac{-b}{2.03};$$

$$AL2 = \frac{-(255-g)}{0.39};$$

$$AL3 = \frac{-(r*0.299+g*0.587+1)}{[(b*0.114+1)*2]};$$

$$AH1 = \frac{g}{0.39};$$

$$AH2 = \frac{(255-b)}{2.03}; \text{ and}$$

$$AH3 = \frac{(r*0.299+g*0.587+1)}{[(b*0.114+1)*2]};$$

wherein r stands for a grayscale of a red component of the respective one of the plurality of subpixels of the image; g stands for a grayscale of a green component of the respective one of the plurality of subpixels of the image; and b stands for a grayscale of a blue component of the respective one of the plurality of subpixels of the image.

5. The method of claim 3, further comprising respectively modifying data signals of the plurality of subpixels of the reconstituted watermark image by the upper limit and the lower limit thereby generating a modified watermark image comprising modified data signals;

wherein, if a data signal of a respective one of the plurality of subpixels of the reconstituted watermark image is less than the lower limit, the data signal is modified to an assigned value of the lower limit; and if a data signal of a respective one of the plurality of subpixels of the reconstituted watermark image is greater than the upper limit, the data signal is modified to an assigned value of the upper limit.

6. The method of claim 5, further comprising embedding the modified data signals of the modified watermark image into the image.

7. The method of claim 6, wherein performing the Fourier transformation on the single block image to obtain a two-dimensional Fourier spectrum comprises performing a Fourier transformation on a U component of the single block image in a YUV space to obtain the two-dimensional Fourier spectrum; and embedding the modified data signals of the modified watermark image into the image comprises embedding a modified data signal of the modified watermark image into a U component of the image in the YUV space.

8. The method of claim 7, subsequent to embedding the modified data signal of the modified watermark image into a U component of the image in the YUV space, further comprising converting a format of the image from one in the YUV space into one in an RGB space.

9. The method of claim 1, wherein the image is an original image.

10. The method of claim 1, further comprising converting an original image into the image;

wherein a respective one of the plurality of blocks of the same size has a size of w×h subpixels; and the original image has a size of W×H subpixels, at least W is not an integral multiples of w;

wherein converting the original image into the image comprises expanding the original image using dummy subpixels having zero values to generate the image; and the image has a size of W'×H' subpixels, wherein W' is an integral multiples of w, and H'≥H.

11. The method of claim 1, wherein inserting the watermark into the frequency domain of the two-dimensional Fourier spectrum comprises inserting N numbers of binary numbers into the frequency domain of the two-dimensional Fourier spectrum;

wherein inserting the N numbers of binary numbers into the frequency domain of the two-dimensional Fourier spectrum comprises:

selecting N pairs of frequency points in the frequency domain of the two-dimensional Fourier spectrum corresponding to the N numbers of binary numbers, a respective one of the N numbers of binary numbers is represented as B(n), 1≤n≤N, a respective one of the N pairs of frequency points is represented as {[x1(n), y1(n)], [x2(n), y2(n)]}, x and y stand for coordinates of a frequency point along a horizontal axis and a vertical axis;

calculating amplitudes of frequency points of the respective pair of the N pairs of frequency points, the amplitudes are represented as A1(n) and A2(n), respectively;

if B(n) has a value of 1, modifying an amplitude of a frequency point [x1(n), y1(n)] to a value of TH+A2(n)−A1(n) while maintaining an argument of the frequency point [x1(n), y1(n)] unchanged, and modifying a coefficient of a frequency point [x2(n), y2(n)] to a value of 0;

if B(n) has a value of 0, modifying an amplitude of a frequency point [x1(n), y1(n)] to a value of TH+A1(n)−A2(n) while maintaining an argument of the frequency point [x1(n), y1(n)] unchanged, and modifying a coefficient of a frequency point [x2(n), y2(n)] to a value of 0; and assigning 0 as values of coefficients of frequency points other than the frequency points of the N pairs of frequency points;

wherein TH stands for a degree of embedding strength of the watermark.

12. An apparatus for encoding a watermark into a digital image, comprising:

a memory; and one or more processors;

wherein the memory and the one or more processors are connected with each other; and the memory stores computer-executable instructions for controlling the one or more processors to:

partition an image into a plurality of blocks of a same size;

accumulate the plurality of blocks of the same size into a single block image;

perform a Fourier transformation on the single block image to obtain a two-dimensional Fourier spectrum defined by Fourier coefficients at different positions of a Fourier domain;

insert a watermark into a frequency domain of the two-dimensional Fourier spectrum by modifying the two-dimensional Fourier spectrum as a function of watermarking coefficients in the watermark, to obtain a modified Fourier spectrum;

perform an inverse Fourier transformation on the modified Fourier spectrum to obtain a watermarked image;

copy the watermarked image horizontally and vertically into a plurality of copied watermarked images; and splice the plurality of copied watermarked images into a reconstituted watermark image having a same size as the image, a respective subpixel of the reconstituted watermark image corresponding to a respective subpixel of the image.

13. A method of detecting a watermark in a digital image, comprising:

partitioning an image into a plurality of blocks of a same size;

accumulating the plurality of blocks of the same size into a single block image;

performing a Fourier transformation on the single block image to obtain a two-dimensional Fourier spectrum defined by Fourier coefficients at different positions of a Fourier domain;

extracting data signals of a watermark image from the Fourier coefficients; and converting an original image into the image;

wherein a respective one of the plurality of blocks of the same size has a size of w×h subpixels; and the original image has a size of W×H subpixels, at least W is not an integral multiples of w;

wherein converting the original image into the image comprises expanding the original image using dummy subpixels having zero values to generate the image; and the image has a size of W'×H' subpixels, wherein W' is an integral multiples of w, and H'≥H.

14. The method of claim 13, wherein performing the Fourier transformation on the single block image to obtain a two-dimensional Fourier spectrum comprises performing a Fourier transformation on a U component of the single block image in a YUV space to obtain the two-dimensional Fourier spectrum.

15. The method of claim 14, prior to partitioning the image into the plurality of blocks of the same size, further comprising converting a format of the image from one in an RGB space into one in the YUV space;

wherein partitioning the image into a plurality of blocks of a same size comprises partitioning a U component of the image into the plurality of blocks of a same size.

16. The method of claim 13, wherein the data signals of the watermark image comprise N numbers of binary numbers, a respective one of the N numbers of binary numbers is represented as $B(n)$, $1 \leq n \leq N$;

wherein extracting the data signals of the watermark image from the Fourier coefficients comprises:

selecting N pairs of frequency points in a frequency domain of the two-dimensional Fourier spectrum corresponding to the N numbers of binary numbers, a respective one of the N pairs of frequency points is represented as $\{[x1(n), y1(n)], [x2(n), y2(n)]\}$, x and y stand for coordinates of a frequency point along a horizontal axis and a vertical axis;

calculating amplitudes of frequency points of the respective pair of the N pairs of frequency points, the amplitudes are represented as $A1(n)$ and $A2(n)$, respectively;

determining a value of $B(n)$ to be 1 if $A1(n)$ is greater than $A2(n)$; and determining a value of $B(n)$ to be 0 if $A1(n)$ is less than $A2(n)$.

\* \* \* \* \*